June 23, 1936.  J. A. FURNESS  2,045,223
ADJUSTMENT OF BRAKING MECHANISM FOR AUTOMOBILES AND OTHER VEHICLES
Filed Dec. 5, 1933   3 Sheets-Sheet 1
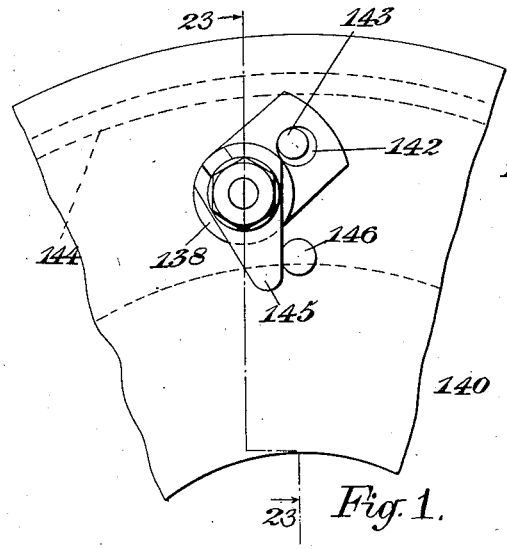
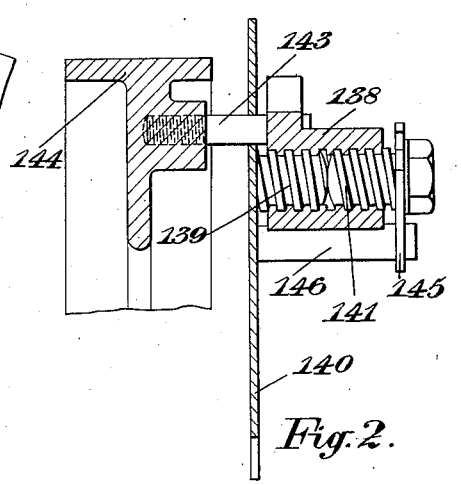
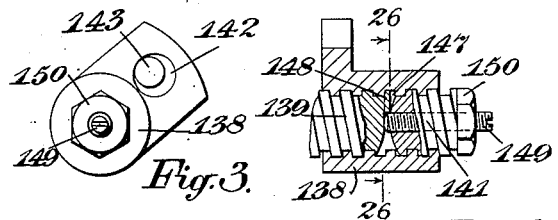
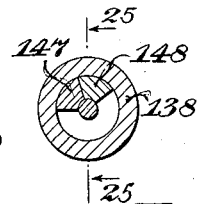
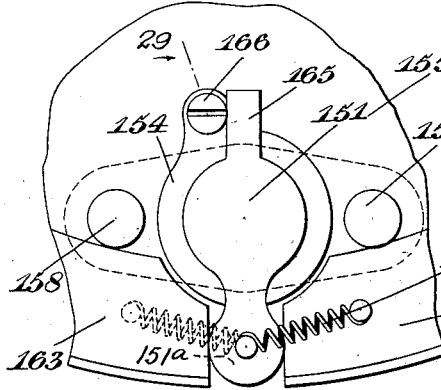
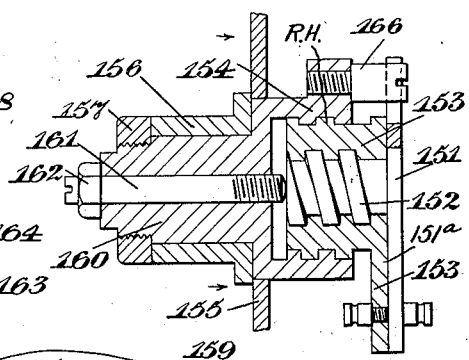
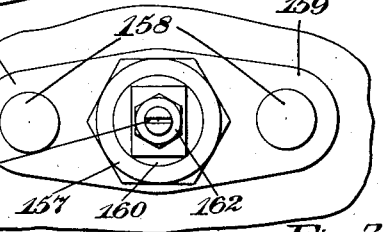
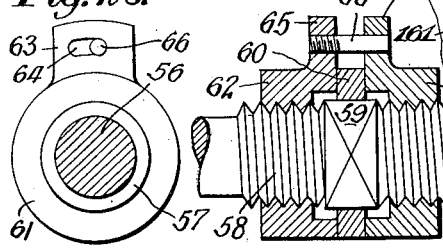
J. A. Furness, INVENTOR
By Marks & Clerk, Attys.

June 23, 1936.  J. A. FURNESS  2,045,223
ADJUSTMENT OF BRAKING MECHANISM FOR AUTOMOBILES AND OTHER VEHICLES
Filed Dec. 5, 1933  3 Sheets-Sheet 2
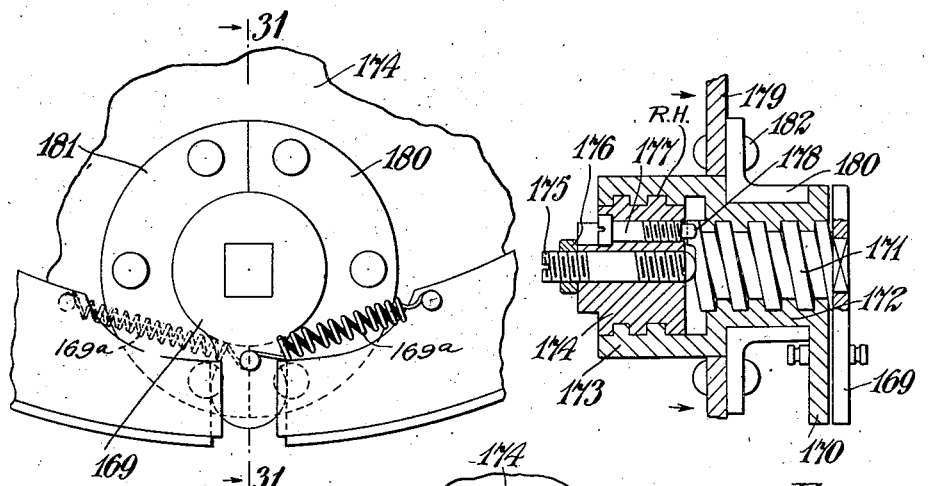
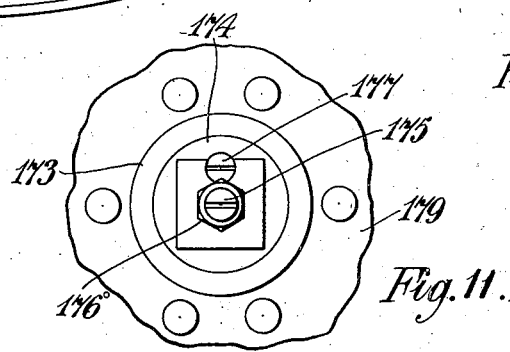
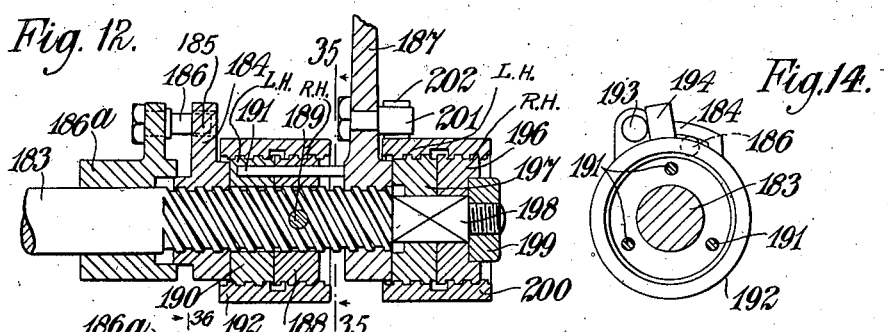
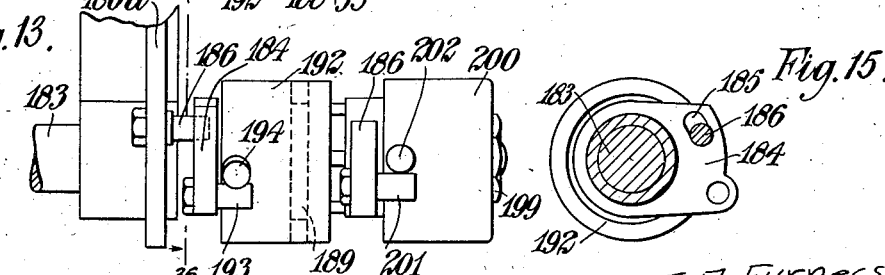
J. A. Furness
INVENTOR
By Marks & Clerk
Attys.

June 23, 1936. J. A. FURNESS 2,045,223
ADJUSTMENT OF BRAKING MECHANISM FOR AUTOMOBILES AND OTHER VEHICLES
Filed Dec. 5, 1933 3 Sheets-Sheet 3
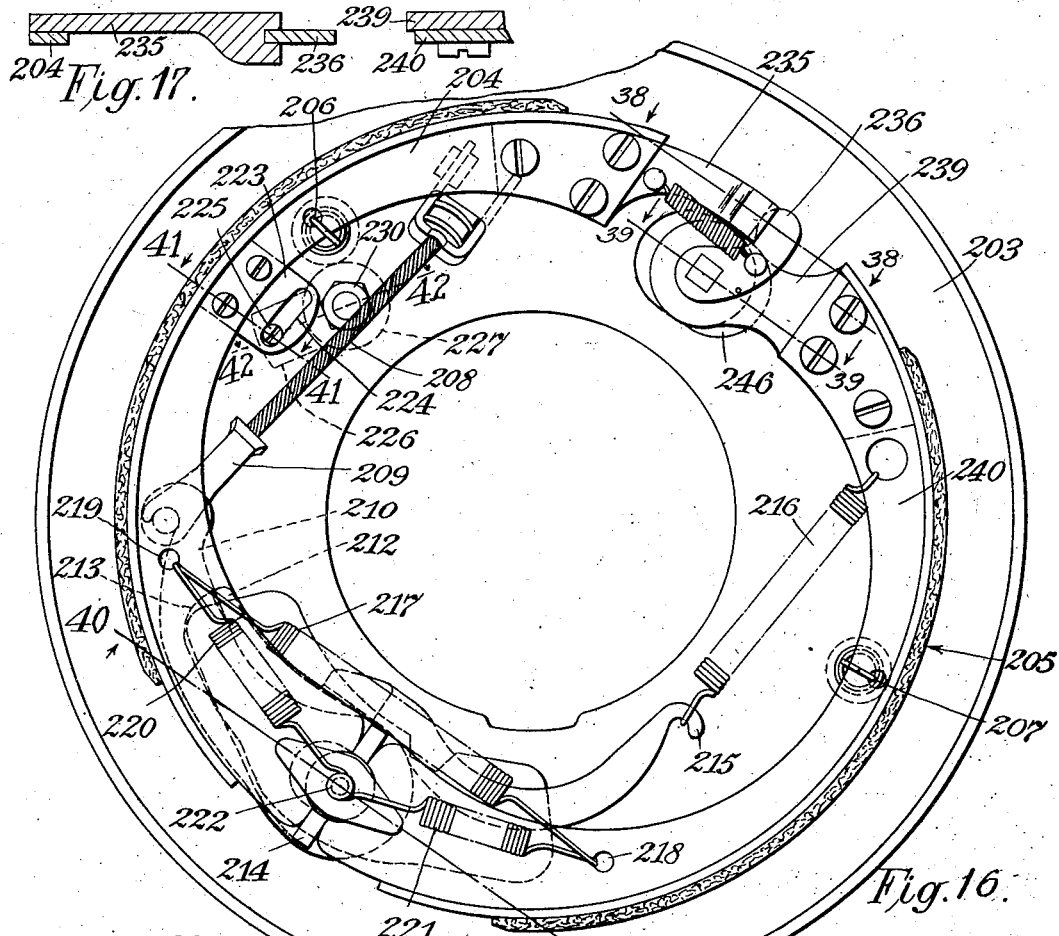
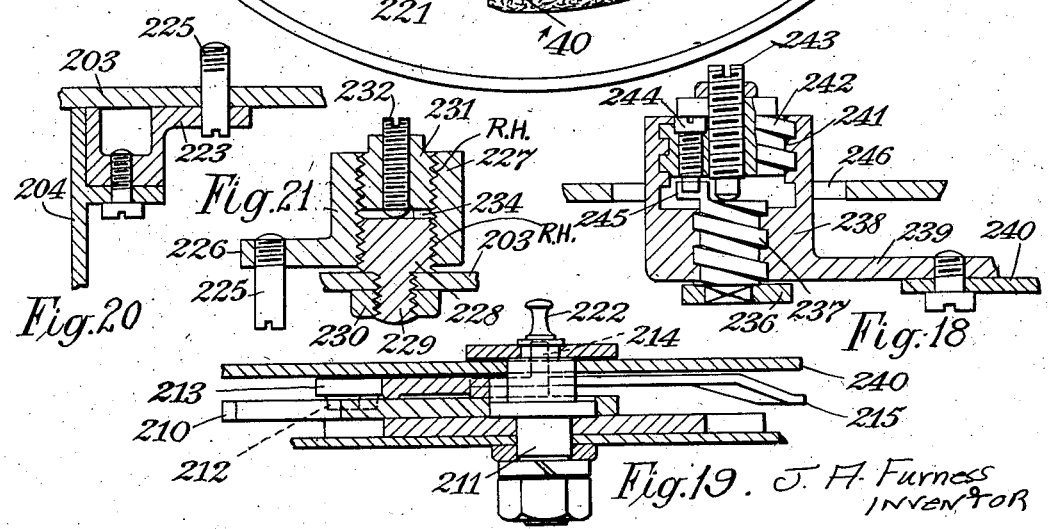
J. A. Furness
INVENTOR
By Marks & Clerk
Attys.

UNITED STATES PATENT OFFICE 2,045,223

ADJUSTMENT OF BRAKING MECHANISM FOR AUTOMOBILES AND OTHER VEHICLES

John Algerton Furness, Bromley, England

Application December 5, 1933, Serial No. 701,068
In Great Britain December 9, 1932

4 Claims. (Cl. 188—79.5)

This invention relates to braking mechanism for automobiles and other vehicles.

The wear which takes place between the frictional surfaces of braking mechanism necessitates more or less frequent adjustments due to the effects of wear operating in the direction of increasing the clearance between the brake shoes or their equivalents and the brake drum when the brake shoes or their equivalents are in the "off" position with the result that, for instance with a pedal operated brake unprovided with means automatically compensating for wear, to secure a given braking effect the pedal has to be progressively moved a greater distance from its normal "off" position and when, as is usual, a cam is arranged between the adjacent ends of the brake shoes, the cam has to be rotated about its axis through an angle of progressively increasing magnitude.

Normally, braking mechanism is provided with means whereby the necessary adjustments may be effected from time to time such adjustments in some cases involving one or more of the following operations, namely:—

Variation in the position of the abutments against which the brake shoes will be supported on their cover or anchoring plate when in the "off" position;

Increase in width of the abutment or fulcrum for the ends of the brake shoes remote from the cam or the equivalent whereby the expansion of the shoes against the drum is effected, and Movement of the lever actuating the spindle with which the cam or its equivalent is associated in order to bring the lever into a position in which it may be more effectively operated upon by the rods or the like connecting it with the pedal or hand lever or other means to which motion is imparted by the driver of the vehicle in applying the brakes.

The object of the present invention is to provide improvements in braking mechanism whereby adjustments called for by wear of the frictional surfaces are automatically effected in the normal actuation of the braking mechanism in order to ensure, notwithstanding wear of the frictional surfaces, the maintenance of a substantially constant clearance between the brake shoes or their equivalent and the brake drum in the "off" position of the brakes and to secure that a substantially fixed or constant degree of motion of the brake shoes or other movable elements of the braking mechanism is needed in applying the brakes.

According to the invention with an element of the braking mechanism to which, following upon the results of wear of the frictional surfaces, an increasing degree of movement would otherwise have to be imparted to secure a given braking effect there is associated a device including a member providing correspondingly inclined helical surfaces and a pair of relatively rotatable members having similar helical surfaces contacting with the helical surfaces of the first-mentioned member and means adapted to cause the pair of relatively rotatable members to come into step to allow free rotational movement of the first-mentioned member in one direction relative to the said pair of members and to cause the said pair of relatively rotatable members to move into an out of step relation when the first-mentioned member is rotated in the reverse direction and thereby secure a locking effect after the first-mentioned member has been rotated in the said direction to a given degree.

Conveniently in accordance with the invention, a device as defined may be associated with a brake shoe or each of the brake shoes at a point intermediate between the end of the shoe which co-operates with the fulcrum and the end thereof which co-operates with a cam.

Conveniently, in accordance with the invention, an additional device may be associated with the fulcrum of the brake shoes in such manner as to ensure that, notwithstanding wear upon the frictional surfaces, clearance between the operating cam and the ends of the brake shoes in the "set off" position is eliminated.

Preferably with such a construction the device in question is associated with the fulcrum in such manner that the effective width of the fulcrum between the adjacent ends of the brake shoes progressively increases in proportion with the wear on the frictional surfaces.

Further, in accordance with the invention, a device as defined may be associated with the spindle to which is secured a cam actuated in a given sense in applying the brakes in such manner as to ensure that notwithstanding wear upon the frictional surfaces after the brakes have been applied the cam moves a substantially constant or fixed distance in the contrary sense to the "off" position.

Where in accordance with the invention, means as described in the preceding paragraph is provided for securing that the cam moves a substantially constant or fixed distance in releasing the brakes, the effect of wear will cause, when the brakes are in the "off" position, the cam and the spindle with which it is associated to assume positions progressively advancing about the said axis with the result that unless some compensating device is applied, the lever or levers whereby the spindle is rotated will similarly be caused to advance progressively.

The invention includes the connection of the spindle in question with the lever whereby motion is imparted to it through the intermediary of a device as defined above for the purpose of ensuring that the lever returns substantially to the same position when the brakes are "off" and that substantially the same degree of angular motion of the lever is required for securing a given braking effect notwithstanding the amount of wear of the frictional surfaces which may have taken place.

The invention will be described further in detail and by way of example with reference to the accompanying drawings, in which:—

Figure 1 illustrates a construction in accordance with the invention as applied to the adjustment of hydraulic brakes.

Figure 2 is a section on the line 23—23 of Figure 1;

Figure 3 is a view in front elevation of an alternative arrangement,

Figure 4 being a view in section on the line 25—25 of Figure 5 which, in turn, is a view in section on the line 26—26 of Figure 4 illustrating this arrangement;

Figure 6 is a view in elevation of a further construction as applied to brakes having shoes with fixed fulcrums;

Figure 7 is also an end elevation of the same construction viewed in the direction of the arrow from Figure 8;

Figure 8 is a view in section on the line 29—29 of Figure 6;

Figure 9 is a view in end elevation of a further application of the invention to brakes having shoes with fixed fulcrums, Figure 10 being a view thereof in section on the line 31—31 of Figure 9, and Figure 11 is an end elevation viewed in the direction of the arrows in Figure 10;

Figure 12 is a view in section of a further application of the invention to cam actuated brake shoes;

Figure 13 being a plan view thereof,

Figure 14 being a view in section on the line 35—35 of Figure 12;

Figure 15 is a view in section on the line 36—36 of Figure 13;

Figure 16 is a view in elevation illustrating the application of the invention to brakes of the floating shoe type, while Figures 17, 18, 19, 20 and 21 are, respectively, fragmentary views in section on the lines 38—38, 39—39, 40—40, 41—41 and 42—42 of Figure 16;

Figure 22 is a fragmentary view partly in section illustrating a modification which may be carried out in certain parts of the constructions illustrated in certain of the preceding figures, Figure 23 being a view in cross-section of the same.

Figures 1 to 5 illustrate the invention as applied to the automatic adjustment of one of the shoes of a hydraulic brake. In this construction there is provided a nut-member 138 having a right-hand internal screw-thread and it is mounted on a corresponding screw-thread on stud 139 secured in the housing plate 140 whilst a locking member 141 with a corresponding external screw-thread is likewise mounted within the nut-member 138.

The slot 142 provided in the nut-member 138 is adapted to engage with the pin 143 passing through the housing plate and rigidly secured in the brake shoe 144.

The degree of movement permitted to the pin 143 in the slot 142 determines the degree of set-clearance between the shoe and the brake drum in the "off" position. An arm 145, Figures 1 and 2, secured to the locking member 141 is adapted to bear on a fixed stop 146 secured in the housing plate in order that the locking member 141 may not be rotated by the nut-member 138 in an anti-clockwise direction (Figure 1) and carried by that member axially from the stud 139 whilst the adjacent ends of the stud and the locking member 141 are so formed as to reduce the frictional contact between them, and the locking member serves as a stop and prevents axial movement of nut-member 138 from right to left (Figure 2) and consequently its independent rotary movement in relation to stud 139 in a clockwise direction.

In connection with the above description it may be pointed out that should occasion render it desirable to provide an equivalent of the nut-member 138 with a left-hand internal screw-thread, the locking means will be arranged to prevent the nut-member being moved in a clockwise direction.

Generally it will be found convenient or even necessary to associate with one shoe a nut-member as 138 having a right-hand thread and to associate with the other shoe a similar nut-member having a left-hand thread.

Independent rotation of the nut-member 138 in relation to the stud 139 is permitted in an anti-clockwise direction (Figure 1) when the shoes are brought into frictional contact with the drum, in applying the brake and during this movement anything more than a slight rotation of the stud 141 is prevented by abutment of the arm 145 against the stop 146 so that during brake application the nut member 138 moves axially to the right (Fig. 2). Independent rotation of the nut-member 138 in relation to the stud 139 in a clockwise direction is, however, precluded when the shoes are released by reason of the fact that the stud 141 is now rotated slightly until it reaches a position where it is in an out of step relation with the stud 139 and beyond this point the nut member 138 is locked against further rotational movement in a clockwise direction. In view of this action the brake shoes advance progressively in that sense or direction in which wear occurs on the brake linings. The return movement of the shoes is therefore limited to the degree of free movement permitted to the pin 143 in the slot 142.

In Figures 3, 4 and 5 is shown an alternative and simplified design. In place of the arm 145 and fixed stop 146 a dog 147 (Figure 5) is provided on the end of locking member 141 adapted to bear on a like member 148 provided on the adjacent end of the stud 139 whereby when the nut-member 138 is rotated in an anti-clockwise direction the locking member 141 is prevented from rotating likewise, the adjusting screw 149 with the lock nut 150 providing a simple means providing for the adjustment of the degree of permissible relative rotation between the stud 139 and the locking member 141.

As the brake linings wear, the nut member 138 will move progressively in an anti-clockwise direction (Fig. 3) and also axially from left to right (Fig. 4). The degree of lost motion permitted to the pin 143 in the slot 142 will however remain the same notwithstanding the position into which the nut member 138 may be moved.

Figures 6 to 8 illustrate certain applications of the invention to brakes in which each of the brake shoes intermediate of its ends is pivotally engaged with an adjustable stop.

In this construction the cam member 151 is provided with an externally screw-threaded member 152 engaging in the member 153 provided with an internal screw-thread and also an external screw-thread by which it is engaged in the inner screw-threaded sleeve 154 which is fixed to the housing plate 155 through the intermediary of a distance piece or bearing 156 and a nut 157. Furthermore, the distance piece or bearing is secured in position by rivets 158 passing through the lugs 159. Through the extension 160 of the sleeve 154 there extends an adjusting screw 161 associated with a nut 162. The cam member 151 and the further cam member 151a on the member 153 are each connected with brake shoes 163 by means of springs, of which one 164 can be seen in full line in Figure 6.

Tension of the spring 164 will tend always to urge the ends of the brake shoes 163 into contact with the cam members 151, 151a, the position shown in Figure 6 being that in which no wear of the brake linings has taken place so that with the two cam members lying one directly behind the other only the cam member 151 is to be seen. Assuming that during brake application wear of the linings takes place, then upon release of the brakes the shoes will tend to move back to a greater distance from the brake drum than that represented by the position shown in Figure 6. This movement back causes the shoes to pivot about the fulcrums intermediate of their ends to which reference has already been made and as a consequence of this the ends of the shoes tend to move apart and through the action of the springs 164 to draw the abutting ends of the cam members with them. In other words this action urges the cam member 151 to rotate in an anti-clockwise direction and the cam member 151a to rotate in a clockwise direction. The members 152 and 153 being caused correspondingly to rotate relatively to one another, in consequence of the rotation of the cam member 151 in an anti-clockwise direction the lug 165 bearing upon the pin 166 causes the sleeve 154 to rotate likewise thereby ensuring that as a consequence of the action of the internal screw threads on the member 154 co-operating with the external screw threads on the member 153 the abutting end of the adjusting member 161 is maintained in the same relation to the adjacent end of the member 152 as is shown in Figure 8. In consequence of this when by the return movement of the brake shoes the lower ends of the cam members have been spread apart to an extent compensating for the wear on the brake linings the members 152, 153 are locked against relative rotation in the opposite direction when the brakes again are applied.

Wear therefore causes the cam members to be progressively rotated so that the fulcrums of the brake shoes move apart to compensate for such wear.

As will be seen the device above described is located between the ends of the shoes remote from the cam whereby they are actuated to secure a braking effect and they form for the shoes a fixed fulcrum the width of which progressively increases as wear takes place.

The adjustable stop with which each of the shoes engages intermediate of its ends acts merely as an intermediate pivot about which the shoe is adapted to pivot under the influence of the brake release spring conventionally provided adjacent to the actuating cam disposed opposite the members 151, 151a on which the shoes are adapted to fulcrum when being applied.

Figures 9 to 11 illustrate an alternative method of applying the invention to brakes generally of the character described in connection with Figures 6 to 8. In this construction the cams indicated by the references 169 and 170 are connected respectively to an externally screw-threaded member 171 and an internally screw-threaded member 172 with which the member 171 is in engagement.

The cams are also connected by means of the springs 169a with the brake shoes.

The member 172 is provided with an extension 173 internally screw-threaded and of larger diameter than the portion indicated by the reference 172 and in this portion there is located an externally screw-threaded member 174 through which there passes an adjusting screw 175 associated with a lock nut 176.

Furthermore, through the screw-threaded portion 174 extends a screw 177 functioning as a stop and cooperating with the projection 178 provided on the end of the member 171. Connection between the adjusting means and the housing plate 179 is effected by a collar formed of two parts 180, 181 secured to the plates by means of rivets 182.

As in the case of the construction illustrated in Figures 6 to 8 the ends of the brake shoes are connected with the cams 169, 170 by means of the springs 169a and the tension of these springs will tend always to urge the ends of the brake shoes into contact with the cams, the position shown in Figure 9 being that in which no wear of the brake linings has taken place so that with the two cams lying one directly behind the other only the cam 169 is to be seen in this view. Again as in the case of the construction illustrated in Figures 6 to 8 assuming that during brake application wear of the linings takes place then upon release of the brakes the shoes will tend to move back to a greater distance from the brake drum than that represented by the position shown in Figure 9. This movement back causes the shoes to pivot about fulcrums intermediate of their ends and as a consequence of this the ends of the shoes tend to move apart and through the action of the springs 169a to draw the abutting ends of the cams with them. In other words this action urges the cam 169 to rotate in an anti-clockwise direction and the cam 170 to rotate in a clockwise direction. In consequence of the anti-clockwise rotation of the cam 169, the member 171 also rotates in a like direction causing the stop 178 which abuts against the projecting end of the screw 177 to rotate the member 174 also in an anti-clockwise direction, thereby causing the adjusting screw 175 to be advanced axially to the right in Figure 10. Clockwise rotation of the cam 170 also causes corresponding rotation of the member 172 and as a consequence of this rotation and the rotation imparted to the member 174 by the stop 178 the projecting end of the adjusting screw 175 is maintained in the same position relative to the member 171 as is shown in Figure 10. In consequence of this when by the return movement of the brake shoes the lower ends of the cams have been spread apart to an extent compensating for the wear on the brake linings the cams 169, 170 are locked against relative rotation in the opposite direction when the brakes again are applied.

With arrangements as described with reference to Figures 6 to 11 further adjusting means must also be associated with each of the brake shoes, such adjusting means being, for instance, of a character similar to that subsequently to be described with reference to Figures 16 to 19.

In the construction illustrated in Figures 12 to 15 with the cam spindle 183 there are associated a device for ensuring that notwithstanding the wear in the frictional surfaces which may take place the cam operating the brake shoes is always permitted the same restricted degree of movement in the release of the brakes and a device for ensuring that notwithstanding such wear a desired restricted movement of the lever actuating the cam and therefore of the brake pedal from the same "off" position through a given distance to the same "on" position shall be required in securing a given braking effect.

The cam spindle 183 in the construction illustrated is provided with a right-hand screw thread of seven-eighths of an inch lead and to put the brakes on it is rotated in an anti-clockwise direction. Such motion of the spindle in the anti-clockwise direction will cause the screw-threaded members 188 and 190, the former of which is connected by the pin 189 with the spindle and the latter indirectly with the spindle by the pins 191 entering holes provided in the member 190 and corresponding holes in the member 188, to move also in an anti-clockwise direction. Consequently, the degree of rotational motion imparted to the members 188 and 190 and to the member 183 will be the same. As the result of such rotational motion the sleeve 192 will likewise be moved in an anti-clockwise direction and the member 184 will also be caused to move in a like direction by reason of the pin 194 on the member 192 abutting against the pin 193 on the member 184 until the end of the slot 185 which is shown uppermost in Figure 15 abuts against the pin 186 on the bracket 186a when further rotational motion of the member 184 will be prevented. In other words, the members 184 and 192 will be held in step and such further rotational motion may be imparted to the spindle 183 as is necessary in applying the brakes.

When the spindle 183 is permitted to move in a clockwise direction in taking off the brakes, the members 192 and 184 will move in the like direction until the lower end of the slot 185, as shown in Figure 15, contacts with the pin 186 and slight further rotational motion of the spindle 183 will cause the member 192 to come out of step with the member 184 or, in other words, secure a locking action between the internal threads on the member 192 and the corresponding threads on the member 190 and the internal threads on the member 184 and the external threads on the member 183.

The above description refers solely to the means for ensuring that the cam whereby the brake shoes are actuated always returns into a position where the same degree of rotational motion imparted to the cam operates to put on the brakes or, in other words, to provide the same amount of "take-off".

The sleeve 192 is provided internally with right and left hand screw-threads of seven-sixteenths of an inch lead, while the members 188 and 190 are provided with corresponding threads and consequent upon wear on the brakes the progressive rotational motion which is imparted to the spindle 183 will cause the members 188 and 190 to move apart, but as the member 188 is secured to the spindle 183 by the pin 189 only the member 190 will move axially with respect to the member 183 and from right to left of Figures 12 and 13.

To ensure that the brake-operating lever always comes back to the same position when the brakes are off, notwithstanding wear on the brake shoes, the lever 187 which is connected in any convenient manner with the brake-operating pedal or hand lever is provided with an internal screw thread of seven-eighths of an inch lead by which it is engaged with the member 183, motion of the lever in an anti-clockwise direction will cause its right-hand face to bear against the nut 197 provided with an external left-hand thread of seven-sixteenths of an inch lead which in effect is part of the member 183 being mounted upon a squared portion thereof in association with a second nut 196 which is provided with a right-hand thread of seven-sixteenths of an inch lead which is also secured on the squared end of the spindle 183. Engaging these nuts 197 and 196 there is a correspondingly internally screw-threaded sleeve 200 on which is furnished a pin 202. Motion in an anticlockwise direction imparted to the lever 187 operates to impart motion to the spindle 183, tending to move the pin 201. When the lever 187 is caused or permitted to move in a clockwise direction in taking "off" the brakes the pin 201 bearing against the pin 202 will carry the sleeve 200 round with it and is therefore caused to rotate on the nut 196 and 197 and such rotational motion will, in turn, cause the nut 197 to move axially away from the nut 196 and thereby follow up the motion of the lever 187 axially with respect to the member 183 from right to left of Figure 12 until one face of the lever bears upon the ends of the pins 191, the distance which the ends of these pins project beyond the face of the element 188 depending upon the motion which may have been imparted to the element 190 axially along the member 183 as the result of wear on the frictional surfaces in the application of the brakes.

Figures 16 to 19 illustrate a brake of the floating shoe type, that is to say, an internal expanding brake of the type in which the friction device anchors at one end when the brake drum is turned in one direction and at the opposite end when the drum is turned in the opposite direction, the shoes being arranged so as to provide a self-energizing action.

Referring to Figure 16, 203 is the housing or backing plate, 204 and 205 are interchangeable arcuate brake shoes which will co-operate with the brake drum, not shown, connected with the housing or backing plate by, respectively, the springs 206, 207. Actuation of the brake, which in the construction illustrated is of the cable operated type, is effected by means of the cable 208, one end of which is provided with a thimble 209 engaging an arm 210 pivoted about the axis of the pin 211 and actuating, through the lug 212, when the brake is applied, the lever 213 associated with the cam 214 whereby the distance between the adjacent ends of the brake shoes is increased in braking.

From the cam lever extends the arm 215 which is connected by the spring 216 with the shoe 205 and operates to centralize the shoes, the shoes being further connected by the spring 217 extending between the holes 218, 219 and, further, from these pins extend springs 220, 221, both being connected with the pin 222, secured coaxially with the pin 211.

The construction and arrangement of the parts so far described is in accordance with existing practice, the brake illustrated being differentiated from a known construction in that novel means is provided for automatically adjusting and compensating for wear on the brake shoes. For this purpose on one of the shoes there is provided a lug 223 in which is formed a slot 224 engaging the pin 225 on the arm 226 extending from an internally screw-threaded member 227 in which is engaged the externally screw-threaded member 228 having a portion of reduced cross-section 229 also screw-threaded and extending through the housing or backing plate 203 being secured thereto by a nut 230.

Furthermore, in the internally screw-threaded member 227 there is located a screw-threaded element 231 through which extends an adjusting screw 232. On the faces of the members 228 and 231 there are provided co-operating projections indicated generally by the reference 234. While the member 227 is free to move axially with respect to 228 in one direction, only a limited degree of motion is permitted in the reverse direction. Consequently when the brakes are released the shoe will always recede from the surface of the drum a fixed amount. In addition, for providing means of adjustment which substitutes the usual screw devices provided in brakes of a similar type for moving apart the adjacent ends of the brake shoes which are remote from the cam actuating mechanism, the extension 235 on the brake shoe 204 is connected with an arm 236 secured to the squared end of the screw-threaded member 237 engaged in one end of the internally screw-threaded sleeve 238, in turn connected by the arm 239 with the web 240 of the shoe 205.

As will be seen, the sleeve 238 is provided with an internally screw-threaded portion 241 in which is engaged the externally screw-threaded member 242 through which passes an adjusting screw 243 and a set screw 244 which co-operates with a lug 245 on the member 237.

The member 238 extends freely through the opening 246 in the housing or backing plate in order that the floating motion of the brake shoes, which is a feature of this type of brake, may not be impeded.

With this construction the pins 225 operate as intermediate pivots about which the shoes are adapted to pivot under the influence of the brake release springs, and as wear takes place in the frictional surfaces the member 227 owing to its co-operation with the members 228 and 231 (in a similar manner to the co-operation with one another of the members 138, 139, 141 shown in Figure 1) will progressively advance the arm 226 and hence the pin 225 towards the brake drum so that the clearance between the brake shoe and the brake drum will remain constant notwithstanding such wear. At the same time as this advance takes place, co-operation in a like manner of the sleeve 238 with the members 237, 242, will cause corresponding rotation of the arm 236 relative to the arm 239 in a direction tending to force apart to an increasing extent the ends of the brake shoes remote from the operating cam, thus ensuring that the desired clearance is maintained uniformly at all points between the shoes and the drum.

Referring to Figures 22 and 23, 56 is a spindle provided with two screw-threaded portions 57 and 58 and between these two screw-threaded portions a squared portion 59 on which is arranged a square holed washer 60. Engaging, respectively, the screw-threaded portions 57 and 58 are two internally screw-threaded members 61 and 62, the former being provided with a lug 63 in which is formed a slot 64 while the other is provided with a lug 65 in which is engaged a pin 66. The two internally screw-threaded members 61 and 62 may be moved relatively to the spindle 56 in an axial direction in one sense owing to the pin 66 contacting with one end of the slot 64 in which position the members 61 and 62 being in step with one another rotation of the member 61 in an anticlockwise direction will cause the member 62 to be rotated freely in a like direction. Motion of the two members in the reverse sense will, however, be prevented for the reason that when the member 61 is moved in the reverse (clockwise) direction the pin 66 comes out of engagement with the end of the slot thereby causing the members 61, 62 to move in a direction to decrease the axial distance between them and bring them out of step thereby causing the threads to be jammed or seized in consequence of the fact that the said members are precluded from approaching closer to one another than is shown in Figure 22 by the action of the washer 60.

The construction illustrated in these figures may be substituted for the one way mechanism described in connection with the brake operating mechanism shown in any of the previously described figures.

In conclusion it may be pointed out that a power transmitting and locking device is also known in which there is provided a screw-threaded spindle with the threads of which engage two internally screw-threaded members, each of which is provided with a stop adapted when one of the members is rotated in one direction to engage against a stop on the other member so as to permit rotation in unison of both of the members upon the spindle and which in consequence of rotation of one of the members in the opposite sense move out of contact with one another so as to cause binding of the screw threads of the internally screw-threaded members with the threads on the spindle.

What I claim is:

1. Braking mechanism for automobile and other vehicles comprising in operative connection with a part of the mechanism which is displaced during brake operation, a member formed with correspondingly inclined helical surfaces, a pair of relatively rotatable members having similar helical surfaces engaging the helical surfaces of the first-mentioned member, and means adapted to cause the said pair of relatively rotatable members to come into step to allow free rotational movement of the first-mentioned member in one direction relative to the said pair of members and to cause the said pair of relatively rotatable members to move into an out of step relation when the first-mentioned member is rotated in the reverse direction and thereby secure a locking effect after the first-mentioned member has been rotated in the said reverse direction to a given degree.

2. Braking mechanism for automobile and other vehicles comprising in operative connection with a part of the mechanism which is displaced during brake operation, a member formed with correspondingly inclined screw threads, a pair of relatively rotatable members having similar screw threads engaging the screw threads of the first-mentioned member, and means adapted to cause the said pair of relatively rotatable members to come into step to allow free rotational movement of the first-mentioned member in one direction relative to the said pair of members and to cause the said pair of relatively rotatable members to move into an out of step relation when the first-mentioned member is rotated in the reverse direction and thereby secure a locking effect after the first-mentioned member has been rotated in the said reverse direction to a given degree.

3. Braking mechanism for automobile and other vehicles including brake shoes mounted at one end upon a fulcrum and engaging at their other ends with a cam and having in operative association with each of the brake shoes at a point intermediate between the ends thereof a device comprising a member formed with correspondingly inclined helical surfaces, a pair of relatively rotatable members having similar helical surfaces engaging the helical surfaces of the first-mentioned member, and means adapted to cause the said pair of relatively rotatable members to come into step to allow free rotational movement of the first-mentioned member in one direction relative to the said pair of members and to cause the said pair of relatively rotatable members to move into an out of step relation when the first-mentioned member is rotated in the reverse direction and thereby secure a locking effect after the first-mentioned member has been rotated in the said reverse direction to a given degree.

4. Braking mechanism as claimed in claim 3 comprising in association with the fulcrum an additional member formed with correspondingly inclined helical surfaces, an additional pair of relatively rotatable members having similar helical surfaces engaging the helical surfaces of the first-mentioned additional member, and means adapted to cause the said additional pair of relatively rotatable members to come into step to allow free rotational movement of the first-mentioned additional member in one direction relative to the said additional pair of members and to cause the said additional pair of relatively rotatable members to move into an out of step relation when the first-mentioned member is rotated in the reverse direction whereby notwithstanding wear upon the frictional surfaces of the brake shoes clearance between the cam and the ends of the shoes in the "set off" position is eliminated.

JOHN ALGERTON FURNESS.